(12) United States Patent
Nagata et al.

(10) Patent No.: US 11,702,034 B2
(45) Date of Patent: Jul. 18, 2023

(54) BLUETOOTH KEY TO LOCK AND UNLOCK ACCESSORIES

(71) Applicant: Toyota Motor Engineering & Manufacturing North America, Inc., Plano, TX (US)

(72) Inventors: Katsumi Nagata, Foster City, CA (US); Masashi Nakagawa, Sunnyvale, CA (US)

(73) Assignee: TOYOTA MOTOR ENGINEERING & MANUFACTURING NORTH AMERICA, INC., Plano, TX (US)

(*) Notice: Subject to any disclaimer, the term of this patent is extended or adjusted under 35 U.S.C. 154(b) by 169 days.

(21) Appl. No.: 17/162,706

(22) Filed: Jan. 29, 2021

(65) Prior Publication Data

US 2022/0242366 A1 Aug. 4, 2022

(51) Int. Cl.
| | |
|---|---|
| *B60R 25/24* | (2013.01) |
| *B60R 25/23* | (2013.01) |
| *B60R 25/01* | (2013.01) |
| *G07C 5/08* | (2006.01) |
| *G07C 9/00* | (2020.01) |

(52) U.S. Cl.
CPC .............. *B60R 25/24* (2013.01); *B60R 25/01* (2013.01); *B60R 25/23* (2013.01); *G07C 5/085* (2013.01); *G07C 9/00309* (2013.01); *B60R 2325/101* (2013.01); *G07C 2009/00769* (2013.01); *G07C 2009/00984* (2013.01)

(58) Field of Classification Search
None
See application file for complete search history.

(56) References Cited

U.S. PATENT DOCUMENTS

| 9,373,201 B2* | 6/2016 | Jefferies | G06Q 30/0645 |
| 2003/0226706 A1* | 12/2003 | Dixon | B60R 25/006 |
| | | | 180/287 |
| 2014/0149025 A1* | 5/2014 | Fazi | F02N 11/0807 |
| | | | 701/113 |
| 2022/0242366 A1* | 8/2022 | Nagata | G07C 9/00309 |

* cited by examiner

*Primary Examiner* — Carlos Garcia
(74) *Attorney, Agent, or Firm* — Snell & Wilmer LLP

(57) ABSTRACT

A system for controlling the locking of accessories by a vehicle includes a vehicle door, a door lock, and an input device configured to receive user input including an unlock request. The system further includes an accessory lock configured to alternate between a locked accessory state and an unlocked accessory state. The system further includes a network access device. The system further includes an ECU designed to determine a door unlock event in response to the input device receiving the unlock request and to control the door lock to alternate from the locked door state to the unlocked door state in response to determining the door unlock event. The ECU is further designed to control the network access device to instruct the accessory lock to alternate from the locked accessory state to the unlocked accessory state in response to determining the door unlock event.

20 Claims, 6 Drawing Sheets

BLUETOOTH KEY TO LOCK AND UNLOCK ACCESSORIES

BACKGROUND

1. Field

The present disclosure relates to systems and methods for controlling one or more aftermarket accessory locks of a vehicle by the vehicle based on a received lock or unlock request.

2. Description of the Related Art

Most of today's vehicles include key fobs that are usable to lock or unlock vehicle doors from a distance away from the vehicle. For example, a user may depress an "unlock" button on the key fob once to unlock the driver side door and depress the "unlock" button a second time to unlock all vehicle doors. Vehicles can also or instead be unlocked using other methods such as entering a code on a keypad on the vehicle, bringing a mobile device (e.g., a registered cell phone) within a predetermined distance of the vehicle, or the like.

Occasionally, a vehicle owner or user may add an aftermarket product to the vehicle. These aftermarket products may include a lock (referred to as an accessory lock) to secure one or more object to or on the vehicle. For example, these aftermarket products may include ski racks having a lock to secure the skis to the vehicle, a bicycle rack having a lock to secure the bicycle to the vehicle, a rooftop storage compartment with a lock to secure the compartment in a closed position, or the like. Each lock may have a combination code or a different key to unlock them. Many newer accessory locks may be controlled from a distance using a key fob or a separate remote. In order to remotely lock or unlock these accessory locks, a user may depress a button on the key fob or the separate remote. However, it may be difficult for a user to keep track of the key fob and separate remotes for each accessory lock of the vehicle.

Thus, systems and methods for controlling accessory locks by a vehicle are desirable.

SUMMARY

Described herein is a system for controlling the locking of accessories by a vehicle. The system includes a door configured to open to provide access to a cabin of the vehicle. The system further includes a door lock coupled to the door and configured to alternate between a locked door state to resist opening of the door and an unlocked door state to facilitate opening of the door. The system further includes an input device configured to receive user input including an unlock request corresponding to a request to alternate the door lock from the locked door state to the unlocked door state. The system further includes an accessory lock configured to alternate between a locked accessory state to resist access to or removal of an accessory and an unlocked accessory state to facilitate access to or removal of the accessory. The system further includes a network access device configured to transmit signals to the accessory lock. The system further includes an electronic control unit (ECU) coupled to the door lock, the input device, and the network access device. The ECU is designed to determine a door unlock event in response to the input device receiving the unlock request. The ECU is further designed to control the door lock to alternate from the locked door state to the unlocked door state in response to determining the door unlock event. The ECU is further designed to control the network access device to instruct the accessory lock to alternate from the locked accessory state to the unlocked accessary state in response to determining the door unlock event.

Also disclosed is a system for controlling the locking of accessories by a vehicle. The system includes a door configured to open to provide access to a cabin of the vehicle. The system further includes a door lock coupled to the door and configured to alternate between a locked door state to resist opening of the door and an unlocked door state to facilitate opening of the door. The system further includes an input device configured to receive user input including an unlock request corresponding to a request to alternate the door lock from the locked door state to the unlocked door state. The system further includes an accessory lock configured to alternate between a locked accessory state to resist access to or removal of an accessory and an unlocked accessory state to facilitate access to or removal of the accessory. The system further includes a memory configured to store a list of registered accessory locks including the accessory lock. The system further includes a network access device configured to wirelessly transmit signals to the accessory lock. The system further includes an electronic control unit (ECU) coupled to the door lock, the input device, and the network access device. The ECU is designed to determine a door unlock event in response to the input device receiving the unlock request. The ECU is further designed to control the door lock to alternate from the locked door state to the unlocked door state in response to determining the door unlock event. The ECU is further designed to determine a registered event in response to determining that the accessory lock is on the list of registered accessory locks. The ECU is further designed to control the network access device to instruct the accessory lock to alternate from the locked accessory state to the unlocked accessory state in response to determining the door unlock event and in response to determining the registered event.

Also disclosed is a method for controlling the locking of accessories by a vehicle. The method includes receiving, by an input device of the vehicle, an unlock request corresponding to a request to alternate a door lock from a locked door state to an unlocked door state. The method further includes determining, by an electronic control unit (ECU) of the vehicle, a door unlock event when the input device receives the unlock request. The method further includes controlling, by the ECU, the door lock to alternate from the locked door state to the unlocked door state in response to determining the door unlock event. The method further includes controlling, by the ECU, a network access device of the vehicle to instruct an accessory lock to alternate from a locked accessory state to an unlocked accessory state in response to determining the door unlock event.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

DETAILED DESCRIPTION

The present disclosure describes systems and methods for controlling the locking and unlocking of aftermarket accessory locks by a vehicle. The systems and methods provide benefits and advantages such as consolidating multiple remote controllers into a single controller associated with the vehicle (e.g., consolidating from a car key fob and multiple accessory lock remote controllers to a single car key fob). Such consolidation provides the benefits of reducing a quantity of objects (i.e., remote controls) for a driver to keep track of and making it easier for a driver to lock and unlock all locks (i.e., vehicle and aftermarket accessory locks) of a vehicle simultaneously. The systems and methods provide additional benefits and advantages such as keeping a centralized list of registered accessory locks so the driver can always determine which locks have been registered and can modify the list with relative ease. The process of registering new accessory locks can be controlled using a mobile application or user interface with a vehicle touchscreen, advantageously increasing the ease of managing the list of registered accessory locks.

An exemplary system includes a vehicle door with an associated vehicle lock. The system further includes an input device (e.g., a keypad or key fob) usable to control the vehicle lock. The system also includes a vehicle accessory having an accessory lock (e.g., a roof rack lock, a bicycle lock, or the like) that communicates via a wireless protocol. The system also includes a network access device that can communicate with the accessory lock via the wireless protocol. The system further includes an electronic control unit (ECU). The ECU is designed to determine a door lock or unlock event based on the input received by the input device (e.g., it determines a door lock event in response to the input device receiving input to lock the vehicle door). The ECU also controls the vehicle lock to lock or unlock in response to determining the door lock or unlock event. The ECU further controls the network access device to lock or unlock the accessory lock via the wireless protocol in response to determining the door lock or unlock event.

Figure 1:
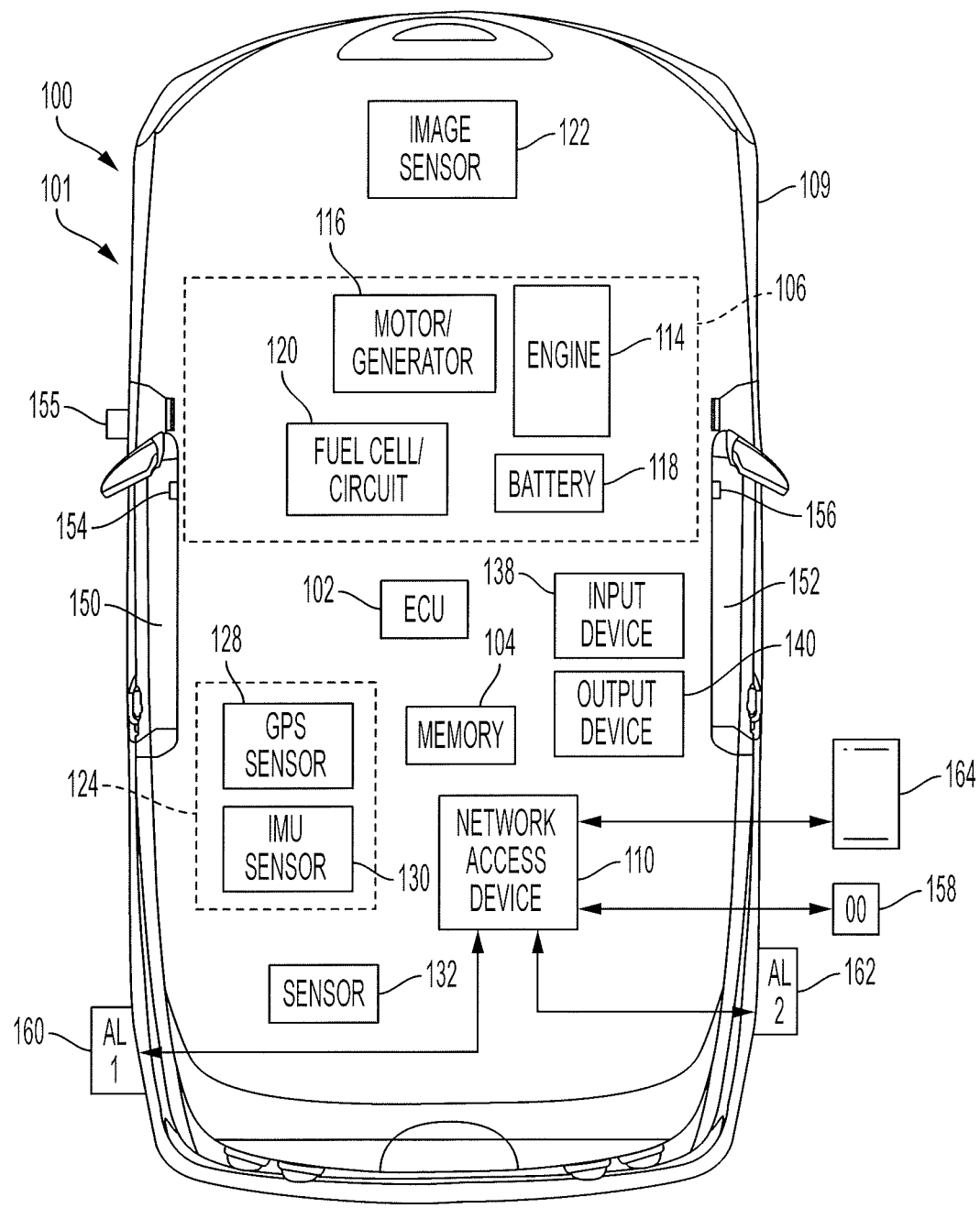
FIG. 1 is a block diagram illustrating a vehicle having a system for controlling aftermarket accessory locks of the vehicle according to an embodiment of the present invention.

Turning to FIG. 1, a vehicle 100 may include a system 101 for controlling the locking and unlocking of vehicle accessory locks (e.g., a cargo lock, a bed cap lock, a bike rack lock, or the like). The vehicle 100 (or system 101) may include an ECU 102, a memory 104, a power source 106, and a main body 109. The vehicle 100 (or system 101) may further include a network access device 110, an image sensor 122, a location sensor 124, and a sensor 132. The vehicle 100 may also include an input device 138 and an output device 140. The main body 109 may include one, two, or more doors 150, 152 and one or more associated lock 154, 156 usable to lock and unlock the doors 150, 152. The locks 154, 156 may be controlled to switch between a locked state and an unlocked state in any of a number of manners such as by entering a known code on a keypad 155, by using a key fob 158, by proximity of a mobile device 164 associated with a vehicle user, or the like. The vehicle 100 may be equipped with a first accessory lock 160 and a second accessory lock 162, one or both of which may be aftermarket parts added to the vehicle 100 by a user or by the dealership from where it was purchased.

The main body 109 may be propelled along a roadway, may be suspended in or on water, or may fly through air. The main body 109 may resemble a vehicle such as a car, a bus, a motorcycle, a boat, an aircraft, or the like. The main body 109 may further support one or more individuals such as a driver, a passenger, or the like. The doors 150, 152 may provide access to an interior of the main body 109 or to another portion of the main body 109 such as a storage compartment or a trunk. The locks 154, 156 may alternate between a locked state in which the doors 150, 152 are prevented from opening and an unlocked state in which the doors may be opened.

As referenced above, the locks 154, 156 may be alternated between the locked state and the unlocked state using any known method such as depressing a button (or combination of buttons) on the key fob 158, by entering a known code on a keypad 155, by entering information on the mobile device 164 (or by bringing the mobile device 164 within a predetermined distance from the main body 109), or the like.

The ECU 102 may be coupled to each of the components of the vehicle 100 and may include one or more processors or controllers which may be specifically designed for automotive systems. The functions of the ECU 102 may be implemented in a single ECU or in multiple ECUs. For example, the ECU 102 may include a body ECU that handles logic functions related to a body of the vehicle (e.g., locking and unlocking door locks, actuating windows up and down, or the like), an engine ECU that manages operation of the engine 114, and the like. The ECU 102 may receive data from components of the vehicle 100, may make determinations based on the received data, and may control the operations of the components based on the determinations.

The vehicle 100 may be non-autonomous, fully autonomous, or semi-autonomous. In that regard, the ECU 102 may control various aspects of the vehicle 100 (such as steering, braking, accelerating, or the like) to maneuver the vehicle 100 from a starting location to a destination location. In some embodiments, the vehicle 100 may be operated in an autonomous, semi-autonomous, or fully driver-operated state. In that regard, the vehicle 100 may be operated independently of driver control and, from time to time, without a person inside of the vehicle 100. The ECU 102 may facilitate such autonomous functionality. The ECU 102 may also, for example, receive data input using the keypad 155, may compare the received digits to the memory 104, and may control the locks 154, 156 to unlock if the received digits match the authorized code in the memory 104.

The memory 104 may include any non-transitory memory and may store data usable by the ECU 102. For example and as described in more detail below, the memory 104 may store a list of accessory locks which are to be controlled along with the door locks 154, 156. The memory 104 may be located in or on the main body 109 and may thus be referred to as a local memory. In some embodiments, the memory 104 may be located remote from the main body 109 and may thus be a remote memory.

The power source 106 may include any one or more of an engine 114, a motor-generator 116, a battery 118, and a fuel cell circuit 120. The engine 114 may convert a fuel into mechanical power for propelling the vehicle 100. In that regard, the engine 114 may be a gasoline engine, a diesel engine, an ethanol engine, or the like.

The battery 118 may store electrical energy. In some embodiments, the battery 118 may include any one or more energy storage device including a battery, a flywheel, a super capacitor, a thermal storage device, or the like. The battery 118 may be used to store power usable by the motor generator 116, power usable to start the engine 114, or the like.

The fuel-cell circuit 120 may include a plurality of fuel cells that facilitate a chemical reaction to generate electrical energy. For example, the fuel cells may receive hydrogen and oxygen, facilitate a reaction between the hydrogen and the oxygen, and output electricity in response to the reaction. In that regard, the electrical energy generated by the fuel-cell circuit 120 may be stored in the battery 118 and/or used by the motor-generator 116 or other electrical components of the vehicle 100. In some embodiments, the vehicle 100 may include multiple fuel-cell circuits including the fuel-cell circuit 120.

The motor-generator 116 may convert the electrical energy stored in the battery 118 (or electrical energy received directly from the fuel-cell circuit 120) into mechanical power usable to propel the vehicle 100. The motor-generator 116 may further convert mechanical power received from the engine 114 or from wheels of the vehicle 100 into electricity, which may be stored in the battery 118 as energy and/or used by other components of the vehicle 100. In some embodiments, the motor-generator 116 may include a motor without a generator portion and, in some embodiments, a separate generator may be provided.

The location sensor 124 may include any sensor capable of detecting data corresponding to a current location of the vehicle 100. For example, the location sensor 124 may include one or more of a global positioning system (GPS) sensor 128, an inertial measurement unit (IMU) sensor 130, or the like. The GPS sensor 128 may detect data corresponding to a location of the vehicle. For example, the GPS sensor 128 may detect global positioning coordinates of the vehicle 100. The IMU sensor 130 may include one or more of an accelerometer, a gyroscope, or the like. The IMU sensor 130 may detect inertial measurement data corresponding to a position, a velocity, an orientation, an acceleration, or the like of the vehicle 100. The inertial measurement data may be used to identify a change in location of the vehicle 100, which the ECU 102 may track in order to determine a current location of the vehicle 100.

The image sensor 122 may be coupled to the main body 109 and may detect image data corresponding to an environment of the vehicle 100. For example, the image sensor 122 may include a camera, a radar detector, a lidar detector, or any other image sensor capable of detecting light having any wavelength. The image sensor 122 may include one or multiple image sensors which may be oriented to detect image data in any direction relative to the main body 109. For example, the image sensor 122 may include four or more radar detectors to detect radar data on all four sides of the main body 109. The image sensor 122 may also or instead include a first camera to detect image data in a forward direction relative to the main body 109 and a second camera to detect image data in a rear direction relative to the main body 109.

In some embodiments, the image sensor 122 may also or instead include a biometric sensor capable of detecting any biometric information corresponding to a user of the vehicle 100. For example, the image sensor 122 may detect a fingerprint, a retina, a face, or the like of the user. As another example, the vehicle 100 may include an external microphone capable of detecting a voice of the user. The biometric information may be used by the ECU 102 to control locking and unlocking of the vehicle. For example, as the user approaches the vehicle, the image sensor 122 may detect image data corresponding to a face of the user. The ECU 102 may compare the image data to the memory 104 and, if the face is stored in the memory 104 as an authorized user, the ECU 102 may unlock the vehicle doors 154, 156.

The sensor 132 may include one or more of a sensor capable of detecting a status of a vehicle component, a sensor capable of detecting environmental conditions (including weather), a voltage sensor, a current sensor, a temperature sensor, a pressure sensor, a fuel gauge, an airflow sensor, an oxygen sensor, or the like.

The input device 138 may include any one or more input device such as a button, a keyboard, a mouse, a touchscreen, a microphone, or the like. The input device 138 may receive input from a user of the vehicle 100 such as a driver or a passenger. In some embodiments, the network access device 110 may be considered an input device as it may receive input from a remote device 164 associated with a vehicle user. The input device 138 may receive, for example, information usable to add an accessory lock (e.g., the accessory lock 160 or the accessory lock 162) to a list of registered accessory locks which may be stored in the memory 104. In some embodiments, one or more of the keypad 155, the key fob 158, or the image sensor 122 may be referred to as an input device.

The output device 140 may include any output device such as a speaker, a display, a touchscreen, or the like. The output device 140 may output data to a user of the vehicle, such as the list of registered accessory locks.

The network access device 110 may include any network access device capable of communicating via a wireless protocol. For example, the network access device 110 may communicate via Bluetooth, Wi-Fi, a cellular protocol, vehicle to vehicle (V2V) communications, Zigbee, or any other wireless protocol. The network access device 110 may be referred to as a data communication module (DCM) and may communicate with any device on the vehicle 100 and/or any remote device. In various embodiments, the network access device 110 may include a transmitter and receiver that are incorporated into the ECU 102 (e.g., the transmitter and receiver may be implemented in a body ECU).

For example, the network access device 110 may receive a signal from the key fob 158 corresponding to a request to lock or unlock the locks 154, 156. As another example, the network access device 110 may communicate with the remote device 164 via any protocol such as Bluetooth, Wi-Fi, a cellular protocol, or the like. The network access device 110 may also transmit signals to the accessory locks 160, 162 (e.g., via Bluetooth) to control the accessory locks 160, 162 to alternate between a locked state and an unlocked state.

The system 101 may be used to control the locking and unlocking of the accessory locks 160, 162. For example, the memory 104 may store a list of registered accessory locks that are authorized to be controlled by the vehicle 100.

Registration information may be received by the input device 138 (e.g., a touchscreen), from the mobile device 164, or the like, and may be used to add or remove an accessory lock from the list of registered accessory locks. For example, a user of the vehicle 100 may provide input to the mobile device 164 to add or remove an accessory lock from the list of registered accessory locks in the memory 104. The mobile device 164 may then transmit the registration information to the ECU 102 via the network access device 110.

The ECU 102 may be designed to determine a vehicle lock/unlock event based on information received from the keypad 155 (e.g., entering an authorized code), the key fob 158 (e.g., the user depressing an unlock or lock button), the mobile device 164 (e.g., the user bringing the mobile device 164 within range of the main body 109), or the image sensor 122 (e.g., the image sensor 122 detecting image data corresponding to a face or fingerprint of the user, or a microphone detecting audio data corresponding to a voice of the user). The ECU 102 may then control one or more of the locks 154, 156 to alternate between the locked state and the unlocked state in response to determining the vehicle lock/unlock event. The ECU 102 may also be designed to control one or more of the accessory locks 160, 162 that are on the list of registered accessory locks to alternate between the locked state and the unlocked state in response to determining the vehicle lock/unlock event. For example, the ECU 102 may control the network access device 110 to transmit an accessory unlock or lock signal to the accessory locks 160, 162 based on the ECU determining the vehicle lock/unlock event. In particular, the ECU 102 may control the accessory locks 160, 162 to unlock after determining a vehicle unlock event, and may control the accessory locks 160, 162 to lock in response to determining a vehicle lock event.

In some embodiments, the ECU 102 may transmit a lock or unlock status signal to the accessory locks 160, 162. For example, the ECU 102 may determine vehicle lock/unlock event in response to a user requesting the locks 154, 156 to be locked or unlocked. The ECU may then transmit a status signal to the accessory locks 160, 162 indicating that the ECU has determined a vehicle lock event (if the request is to lock the locks 154, 156) or a vehicle unlock event (if the request is to unlock the locks 154, 156). The status signal may further indicate which locks 154, 156 are to be unlocked; for example, the status signal may indicate that all locks are to be locked or that only the driver-side lock is to be unlocked. The accessory locks 160, 162 may then receive the status signal. The accessory locks 160, 162 may store a list of vehicle locks 154, 156 indicating which locks 154, 156 the accessory locks 160, 162 are to be aligned with. For example, the accessory lock 160 may store data indicating that it should align with the vehicle lock 154. In response to receiving a status signal indicating that the vehicle lock 154 is to be unlocked, the accessory lock 160 may unlock itself to be aligned with the vehicle lock 154.

In some embodiments, a user or vehicle owner may customize operation of the locks 154, 156 and accessory locks 160, 162. For example, the customization may be based on time data, location data, user data, rental agreement data, or vehicle sharing agreement data. For example, a user may use an app in the mobile device 164 to set a specific time in which the mobile device 164 is usable as a key, and a second specific time in which a second mobile device is usable as a key. This may be advantageous when two or more users share use of the vehicle 100. Continuing the example, a first user may be authorized to use the vehicle 100 from midnight until noon and a second user may be authorized to use the vehicle 100 from noon until midnight. The mobile device 164 (associated with the first user) may function as a key from midnight until noon, and a second mobile device (associated with the second user) may function as a key from noon until midnight. In that regard, the mobile device 164 may lock and unlock the locks 154, 156 and the accessory locks 160, 162.

As another example, the vehicle 100 may be a rideshare vehicle. In that regard, the user may request a pickup from the vehicle 100 using the mobile device 164. The mobile device 164 may then be authorized as a key only between a predetermined pickup location and a destination location. After the user exits the vehicle without a planned continuation using the rideshare platform, the mobile device 164 may cease operating as a key.

As another example, the vehicle 100 may be a rental vehicle. The rental agency may determine that a user has rented the vehicle 100 from a pickup time until a drop-off time. The rental agency may transmit a message to the ECU 102 (e.g., via a cellular protocol from a location remote from the vehicle or via a near-range protocol such as Bluetooth) that the mobile device 164 associated with the user is to function as a key between the pickup time and the drop-off time.

As yet another example, the vehicle 100 may be a rental vehicle. If the user loses his mobile device 164, the user may contact the rental agency. The rental agency may then transmit a message to the ECU 102 (e.g., via a cellular protocol) selecting a new mobile device (e.g., a mobile device associated with a family member of the user) to operate as a key until the drop-off time.

As another example, the accessory locks 160, 162 may be available for rent from the rental agency. In that regard, the rental agency may transmit a message to the ECU 102 indicating whether one or both of the accessory locks 160, 162 is to be locked and unlocked by a vehicle key (e.g., a key fob, a mobile device, or the like). The ECU 102 may control the locks 154, 156 and the identified one or more accessory lock 160, 162 accordingly.

As yet another example, biometric information of a user may be stored in a rideshare database or received at a rental agency. The rideshare software or rental agency may transmit a message including the biometric information of the user to the ECU 102 along with information indicating a geographical area or time frame in which the user is authorized to use the vehicle. The ECU 102 may then accept biometric information associated with the user as a key for the vehicle 100 in the geographical area or during the time frame.

In some embodiments, the ECU 102 may be designed to differentiate between different input patterns received by the respective door-open input device (i.e., the keypad 155, the key fob 158, the mobile device 164, or the like). For example, a single, quick depression of an unlock button of the key fob 158 may be regarded as a first input pattern and two quick depressions in succession of the unlock button may be regarded as a second input pattern. The list of registered accessory locks may store data indicting which input pattern is associated with which accessory lock.

For example, the list of registered accessory locks may indicate that the first accessory lock 160 is to be unlocked in response to the first input pattern being received and that the second accessory lock 162 is to be unlocked in response to the second input pattern being received. In that regard, the ECU 102 may control the network access device 110 to transmit an unlock signal to the first accessory lock 160 in response to determining that the first input pattern is received, and may control the network access device 110 to transmit an unlock signal to the second accessory lock 162 in response to determining that the second input pattern is received. In a similar manner, the list of registered accessory locks may store separate data that associates input patterns for locking the locks 154, 156 with locking of the accessory locks 160, 162.

Figure 2:
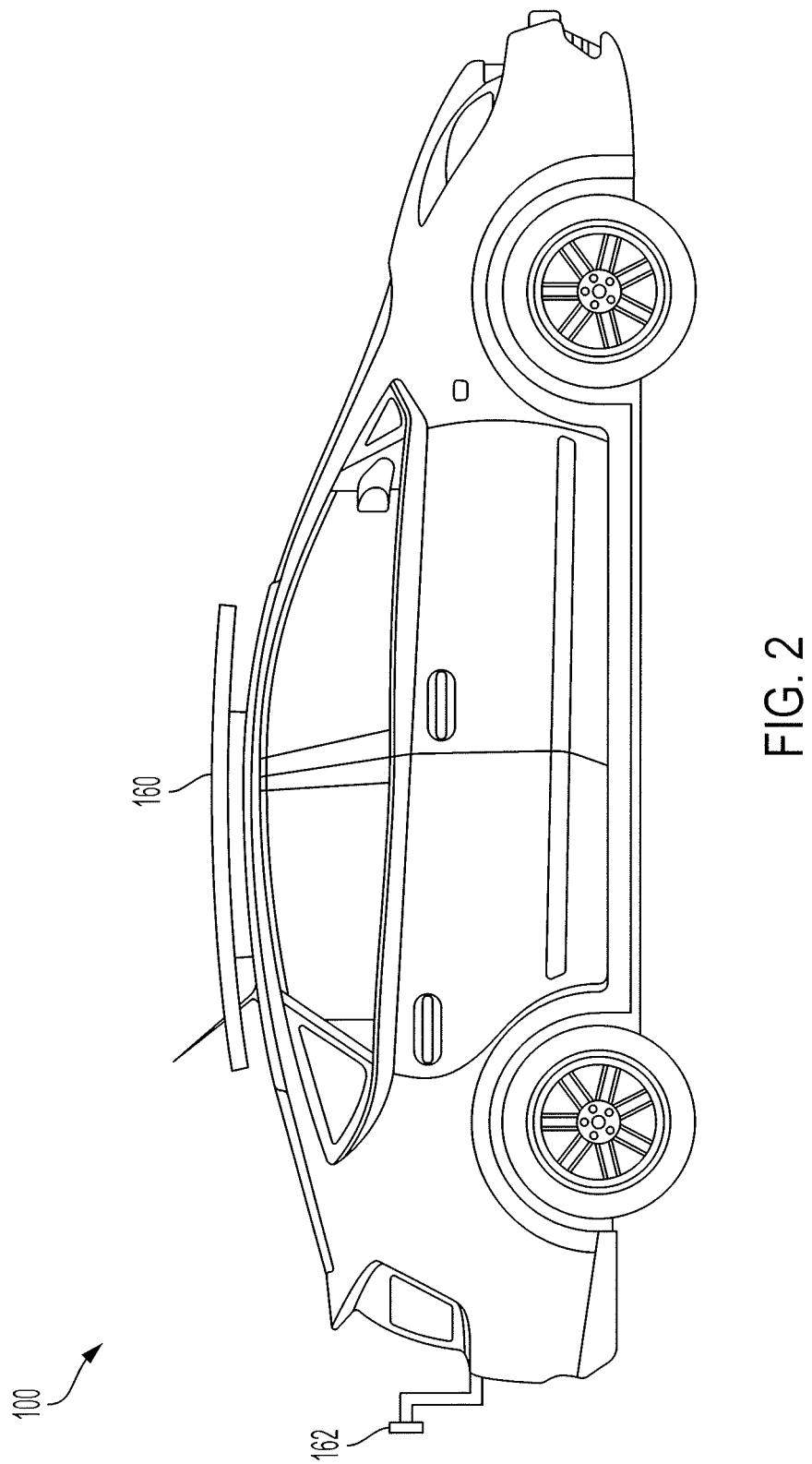
FIG. 2 is a side view of the vehicle of FIG. 1 showing two exemplary accessory locks according to an embodiment of the present invention.

Referring briefly to FIG. 2, the accessory locks 160, 162 may include any type of lock usable with a vehicle. For example, the accessory lock 160 may include ski locks usable to lock skis on a roof of the vehicle 100. As another example, the accessory lock 162 may be a bicycle lock usable to lock a bicycle to the vehicle 100. Accessory locks 160, 162 may also include, for example, a pad lock, a trailer lock, a cargo lock, a bed cap lock, or any other lock usable with the vehicle 100. The accessory locks 160, 162 may be aftermarket products added to the vehicle 100 by a vehicle owner, by a dealer of the vehicle 100, or the like. The accessory locks 160, 162 may be capable of communicating via any known protocol such as Bluetooth, Wi-Fi, or the like.

Figure 3:
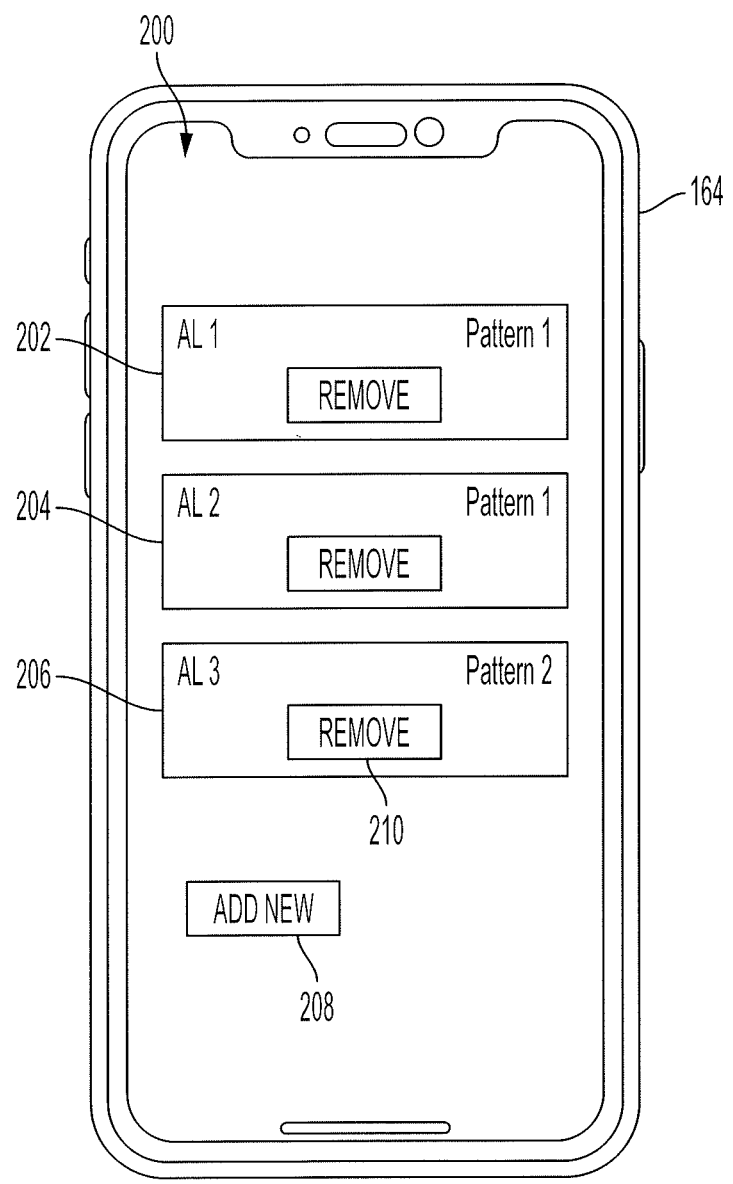
FIG. 3 is a drawing of a remote device of the system of FIG. 1 illustrating a user interface for interfacing with the system according to an embodiment of the present invention.

Referring to FIGS. 1 and 3, a user of the vehicle 100 may manage the list of registered accessory locks using the mobile device 164. In particular, the mobile device 164 may run an application that includes a user interface 200 and may communicate with the ECU 102 via the network access device 110. The user interface 200 may display a list of the currently registered accessory locks. As shown, the current list of registered accessory locks includes a first object 202 associated with the first accessory lock 160, a second object 204 associated with the second accessory lock 162, and a third object 206 associated with a third accessory lock (not shown). The user interface 200 provides a button for removing each of the accessory locks 160, 162. In that regard, if the third accessory lock is no longer in use, the user may remove it from the list of registered accessory locks by clicking the remove button 210 on the third object 206.

The user interface 200 also shows which input patterns are associated with each accessory lock. As shown, the first accessory lock 160 and the second accessory lock 162 are to be unlocked in response to the ECU 102 determining that the first input pattern is received, and the third accessory lock is to be unlocked in response to the ECU 102 determining that the second input pattern is received. In some embodiments, each accessory lock in the list of registered accessory locks may be associated with a first input pattern for unlocking the accessory lock and a second input pattern for locking the accessory lock.

The user interface 200 also includes a button 208 for adding a new accessory lock. In that regard, the user may use the button 208 to add a new accessory lock. In particular, the user may purchase a new accessory lock to be used with the vehicle. The user may then register the new accessory lock using the user interface 200 (e.g., by selecting the button 208 and entering validation information such as a code associated with the new accessory lock). The user may then install the new accessory lock on the vehicle 100. Afterwards, the ECU 102 may control the new accessory lock to lock or unlock based on inputs received by the respective input device (e.g., keypad 155, key fob 158, mobile device 164, or image sensor 122).

The user interface 200 may also include a field for receiving customizable information such as an identifier of a mobile device authorized as a key for the vehicle 100 or a biometric of an authorized user, along with a geographical area or time frame in which the user is authorized to use the vehicle 100.

Figure 4:
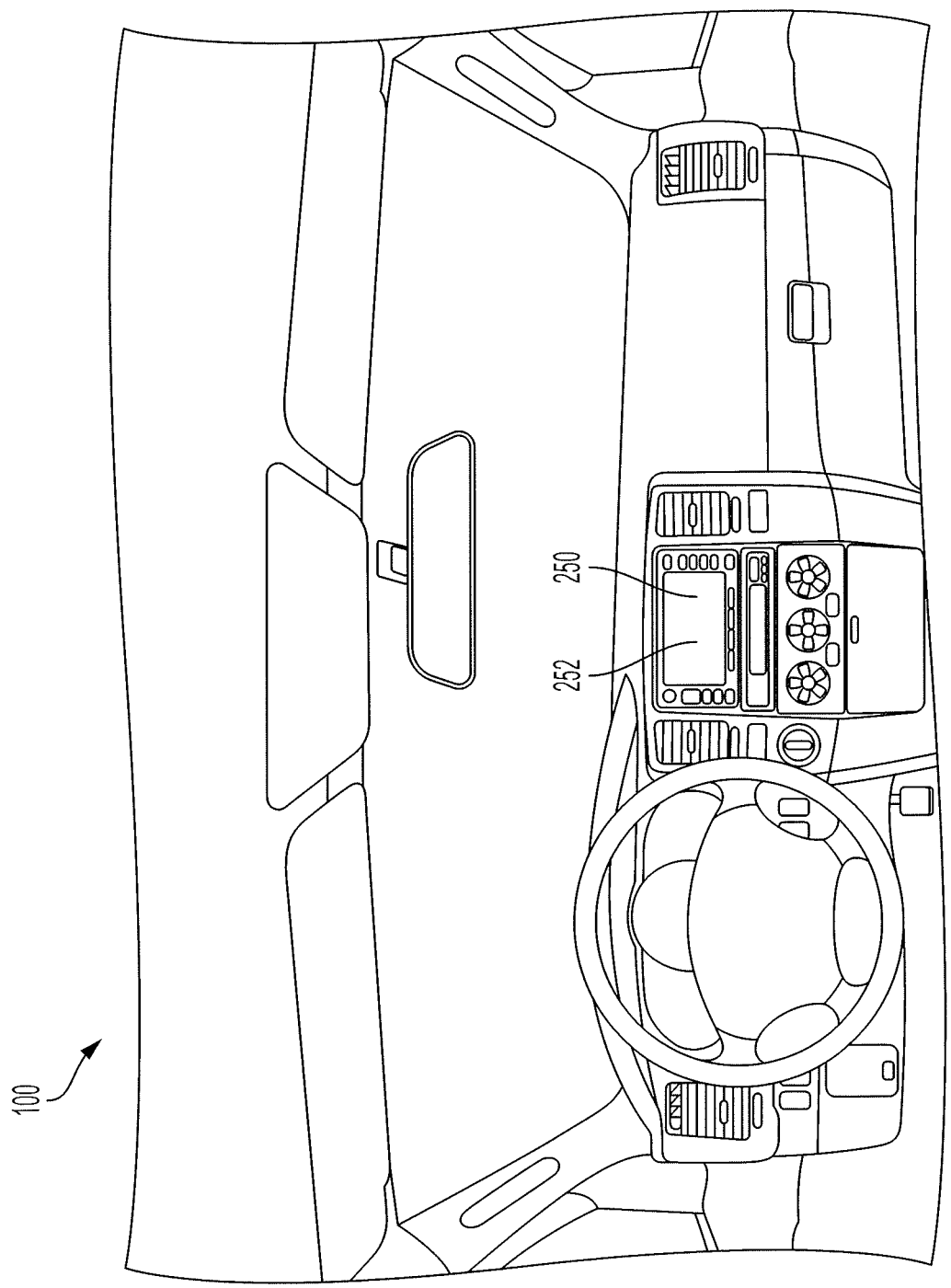
FIG. 4 is a perspective view of a cabin of the vehicle of FIG. 1 showing a touchscreen for displaying a user interface for interfacing with the system of FIG. 1 according to an embodiment of the present invention.

Referring briefly to FIGS. 1 and 4, the vehicle 100 may include a touchscreen 252 in a vehicle cabin that functions as the input device 138 and output device 140. The touchscreen 252 may display and receive input corresponding to a user interface 250. The user interface 250 may include similar features as the user interface 200 of the mobile device 164 and may be used to manage the list of registered accessory locks.

In some embodiments, the touchscreen 252 may receive customizable information corresponding to authorized users of the vehicle (e.g., an identifier of a mobile device authorized as a key to the vehicle or a biometric corresponding to an authorized vehicle, along with an authorized geographical area or time frame).

Figure 5A:
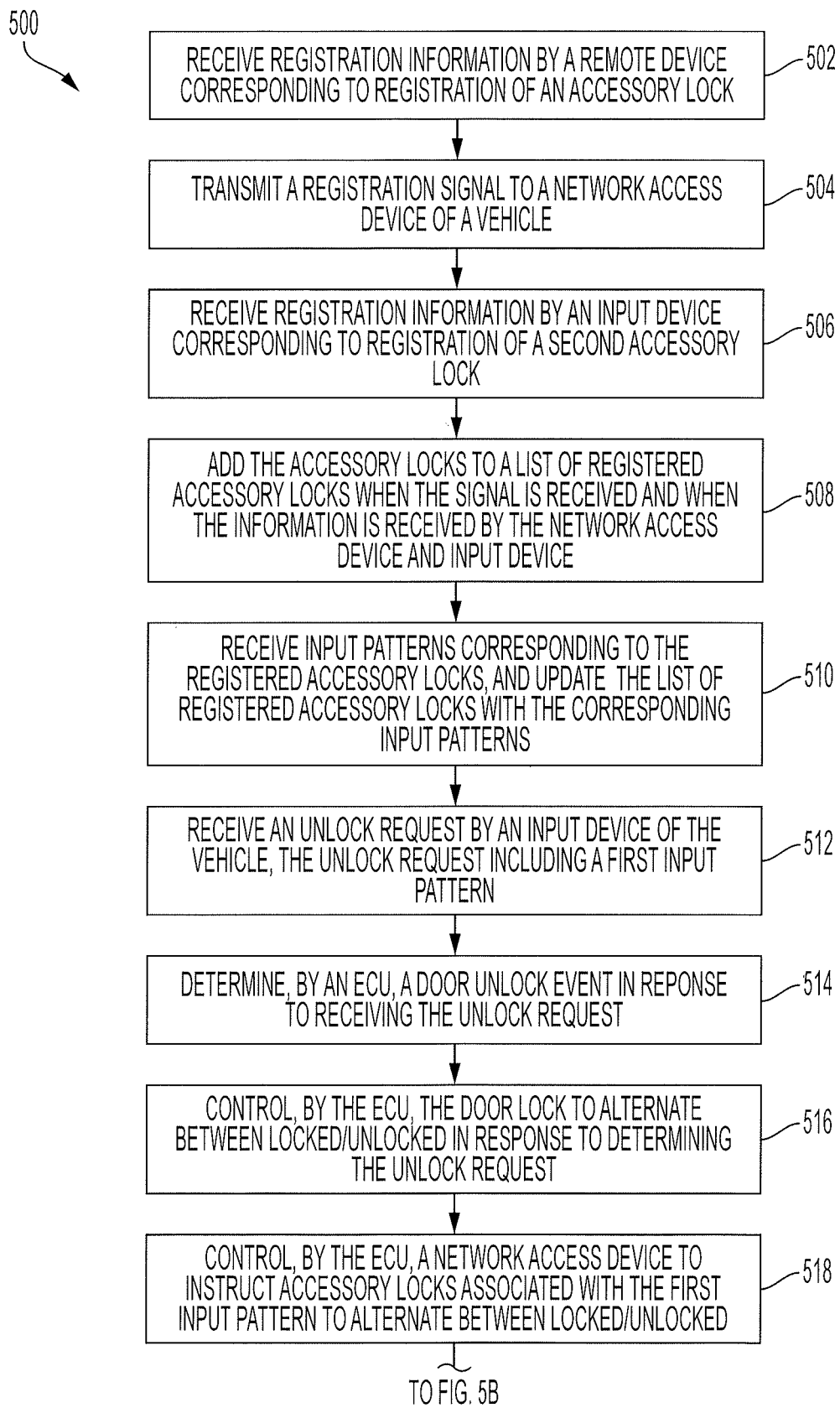
FIGS. 5A and 5B are flowcharts illustrating a method for controlling accessory aftermarket locks of a vehicle according to an embodiment of the present invention.
Figure 5B:
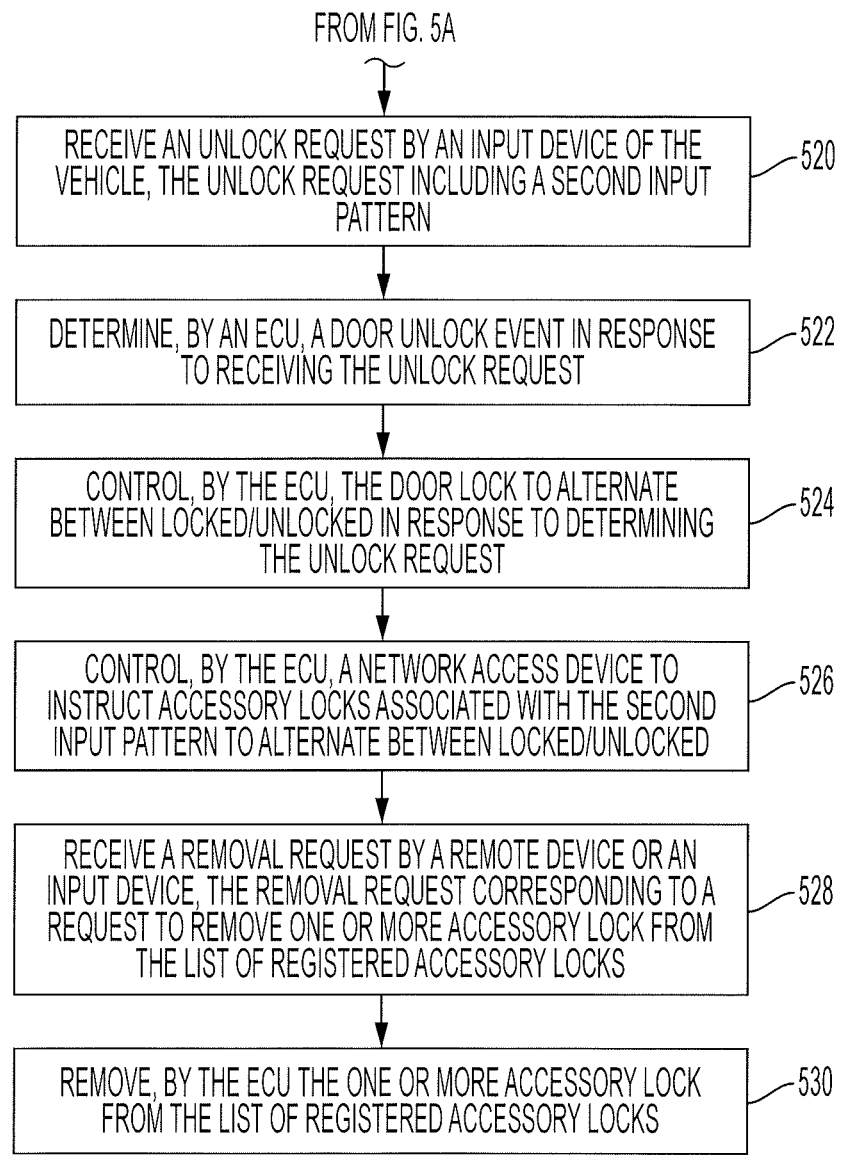

Referring now to FIGS. 5A and 5B, a method 500 for controlling locking and unlocking of accessory locks by a vehicle is shown. The method 500 may be performed by components of a vehicle or system similar to the vehicle 100 or system 101 of FIG. 1. The method 500 begins in block 502 where a remote device may receive registration information corresponding to registration of an accessory lock. The remote device may run an application having a user interface that is designed to communicate with a vehicle. In some embodiments, the remote device may only communicate with the vehicle after receiving authentication information from a user indicating that the user is authorized to communicate with the vehicle. The registration information may include, for example, a security key that confirms authority to manage the accessory lock. The registration information may also or instead include any information that indicates that the user has authority to manage the accessory lock. For example, the registration information may include an identifier of the accessory lock and a password or code that confers authority to manage the accessory lock. In some embodiments, the registration information may further include information indicating a specific input pattern that is to be used to control the accessory lock (e.g., only alternate in response to a single click of a button on a key fob). In some embodiments, the registration information may also or instead include customizable information such as a mobile device associated with an authorized user, a biometric associated with the authorized user, an identification of one or more accessory lock which the user is authorized to utilize, an area in which the user is authorized to use the vehicle, a time frame in which the user is authorized to use the vehicle, or the like.

In block 504, the mobile device may transmit a registration signal to a network access device of a vehicle. The registration signal may include the registration information from block 502 such as the identifier of the accessory lock and the password or code conferring authority to manage the accessory lock. The mobile device may transmit the registration signal via any wireless or wired protocol such as Bluetooth, Wi-Fi, a cellular protocol, or the like.

In some embodiments, the user may manage the list of registered devices using an input device of the vehicle (e.g., a touchscreen) instead of a mobile device. In that regard and in block 506, an input device of the vehicle may receive registration information corresponding to registration of a second accessory lock. The registration information received in block 506 may include similar information as the registration information in block 502. In that regard, the registration information may include a specific input pattern that is to be used to control the second accessory lock (e.g., only alternate in response to a double click of a button on a key fob).

In block 508, the ECU may receive the registration information from one or both of the mobile device or the input device of the vehicle. The ECU may then add the accessory lock associated with the registration information to a list of registered accessory locks that is stored in a vehicle memory (either a local memory or a remote memory). The list of registered accessory locks may further include the input patterns that are associated with each registered accessory lock.

In block 510, the ECU may receive additional information corresponding to input patterns for one or more accessory lock in the list of registered accessory locks. The ECU may receive this information from the mobile device, an input device of the vehicle, or the like. This information may be added with the registration information, or may be added at a point in time after the registration information is received. In this way, a user may change the patterns that are associated with one or more of the registered accessory locks. In some embodiments, the patterns may be associated with commands to unlock a single door lock (e.g., a driver door), to unlock all door locks (e.g., a double click of an unlock button on a key fob), or to open a trunk of the vehicle (e.g., a long depression of an unlock button). Instead of listing the patterns, the list of registered accessory locks may associate each accessory lock with each of the above-referenced commands.

In block 512, an input device associated with the vehicle (e.g., a keypad, a key fob, a mobile device associated with a user of the vehicle, or an image or other biometric sensor) may receive an unlock request to unlock one or more vehicle lock. The unlock request may include a first input pattern. The input pattern may include any pattern such as a single depression of an unlock button of a key fob, a double-click of the unlock button, depressing and holding the unlock button for a predetermined period of time, or the like. As another example, an input pattern may include a first code entered into a keypad or a second code entered into the keypad.

In block 514, the ECU may determine a door lock/unlock event in response to receiving the unlock request. The door lock/unlock event may correspond to an event to lock or unlock one or more specific door(s) of the vehicle (e.g., just unlock a driver door, lock all doors, unlock and open a trunk, etc.). The ECU may further identify the input pattern associated with the door lock/unlock event when determining the door lock/unlock event.

In block 516, the ECU may control one or more door lock to alternate between a locked state and an unlocked state in response to determining the door lock/unlock request. For example, if the door lock/unlock event corresponds to a request to unlock the driver door, the ECU may unlock the driver door only. As another example, if the door lock/unlock event corresponds to a request to unlock and open the trunk, the ECU may control a door lock associated with the trunk to unlock and may actuate the trunk to an opened position. As yet another example, if the door lock/unlock event corresponds to a request to lock all vehicle locks, the ECU may control all door locks to alternate to the locked position.

In block 518, the ECU may compare the input pattern to the list of registered accessory locks to determine if any of the registered accessory locks are to be actuated in response to the specific received input pattern. If one or more accessory lock is to be actuated, the ECU may control a network access device to transmit a signal to the one or more accessory lock. The signal may correspond to an instruction to lock or unlock the one or more accessory lock. For example, if the first input pattern is received by the vehicle input device, the ECU may control a driver door lock of the vehicle to unlock, and may also control the network access device to transmit an unlock signal to the first accessory lock to cause the first accessory lock to unlock. If the vehicle input device then receives an instruction to lock all vehicle door locks, the ECU may lock all unlocked vehicle door locks and may also transmit a lock signal to the accessory locks associated with the lock input to cause the accessory locks to switch to the locked state.

In block 520, the input device of the vehicle may receive a second lock/unlock request corresponding to a request to lock or unlock one or more vehicle door. The second lock/unlock request may include a second input pattern that is different than the first input pattern. For example, the first input pattern may include a single click of an unlock button and the second input pattern may include a double click of the unlock button.

In block 522, the ECU may determine a second door unlock event in response to receiving the second door unlock event. The ECU may also determine which vehicle doors are to be locked/unlocked in the second door unlock event.

In block 524, the ECU may control one or more door lock of the vehicle to alternate between a locked and unlocked state in response to determining the second door unlock event.

In block 526, the ECU may control a network access device to instruct one or more of the accessory locks that is associated with the second input pattern to alternate between the locked state and the unlocked state in response to determining the second door unlock event. For example, the first input pattern may correspond to a request to unlock the vehicle doors and may also correspond to a request to unlock a storage accessory lock. The ECU may unlock the vehicle doors and the storage accessory lock in response to determining the first unlock event. The second input pattern may correspond to a request to unlock and open a vehicle trunk and a request to unlock ski locks on a roof of the vehicle. The ECU may unlock and open the vehicle trunk and may also unlock the ski locks in response to determining the second unlock event.

In block 528, an input device of the vehicle or a remote device may receive a removal request from a user of the vehicle. The removal request may correspond to a request to remove one or more of the accessory locks from the list of registered accessory locks. In that regard, the removal request may further include an identifier of the one or more accessory locks to be removed.

In block 530, the ECU may remove the one or more accessory lock from the list of registered accessory locks after receiving the request from the input device or remote device.

Where used throughout the specification and the claims, "at least one of A or B" includes "A" only, "B" only, or "A and B." Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for controlling locking of accessories by a vehicle, the system comprising:
a door configured to open to provide access to a cabin within the vehicle;
a door lock coupled to the door and configured to alternate between a locked door state to resist opening of the door and an unlocked door state to facilitate the opening of the door;
an input device configured to receive user input including an unlock request corresponding to a request to alternate the door lock from the locked door state to the unlocked door state;
an accessory lock configured to alternate between a locked accessory state to resist access to or removal of an accessory and an unlocked accessory state to facilitate the access to or the removal of the accessory;
a network access device configured to transmit one or more signals to the accessory lock; and
an electronic control unit (ECU) coupled to the door lock, the input device, and the network access device and configured to:
determine a door unlock event in response to the input device receiving the unlock request,
control the door lock to alternate from the locked door state to the unlocked door state in response to the determination of the door unlock event, and
control the network access device to communicate an instruction for the accessory lock to alternate from the locked accessory state to the unlocked accessory state in response to the determination of the door unlock event.

2. The system of claim 1, wherein the accessory lock is an aftermarket lock configured to communicate with the network access device via a wireless protocol.

3. The system of claim 1, further comprising a memory configured to store a list of registered accessory locks including the accessory lock.

4. The system of claim 3, wherein the ECU is further configured to control the network access device to communicate an instruction for each of the registered accessory locks to alternate from the locked accessory state to the unlocked accessory state in response to the determination of the door unlock event.

5. The system of claim 3, wherein:
the network access device is further configured to receive a registration signal corresponding to registration of the accessory lock from a remote device; and
the ECU is further configured to add identifying information corresponding to the accessory lock to the list of registered accessory locks when the network access device receives the registration signal.

6. The system of claim 3, wherein:
the input device is further configured to receive registration information corresponding to registration of the accessory lock; and
the ECU is further configured to add identifying information corresponding to the accessory lock to the list of registered accessory locks when the input device receives the registration information.

7. The system of claim 3, further comprising a key fob configured to transmit the unlock request to the input device in response to receiving a first input.

8. The system of claim 7, wherein:
the list of registered accessory locks includes a first lock setting for the accessory lock indicating that the accessory lock is to alternate from the locked accessory state to the unlocked accessory state in response to a first input pattern received by the key fob;
the key fob is configured to transmit the unlock request to the input device in response to the first input pattern being received by the key fob;
the list of registered accessory locks includes a second lock setting for a second accessory lock indicating that the second accessory lock is to alternate from the locked accessory state to the unlocked accessory state in response to a second input pattern received by the key fob; and
the ECU is further configured to control the network access device to communicate an instruction for the second accessory lock to alternate from the locked accessory state to the unlocked accessory state only in response to the second input pattern being received by the key fob.

9. The system of claim 1, further comprising an in-vehicle infotainment (IVI) system, wherein the ECU is included in the IVI system.

10. A system for controlling locking of accessories by a vehicle, the system comprising:
a door configured to open to provide access to a cabin within the vehicle;
a door lock coupled to the door and configured to alternate between a locked door state to resist opening of the door and an unlocked door state to facilitate the opening of the door;
an input device configured to receive user input including an unlock request corresponding to a request to alternate the door lock from the locked door state to the unlocked door state;
an accessory lock configured to alternate between a locked accessory state to resist access to or removal of an accessory and an unlocked accessory state to facilitate the access to or the removal of the accessory;
a memory configured to store a list of registered accessory locks including the accessory lock;
a network access device configured to wirelessly transmit one or more signals to the accessory lock; and
an electronic control unit (ECU) coupled to the door lock, the input device, and the network access device and configured to:
determine a door unlock event in response to the input device receiving the unlock request,
control the door lock to alternate from the locked door state to the unlocked door state in response to the determination of the door unlock event,
determine a registered event in response to a determination that identifying information corresponding to the accessory lock is included in the list of registered accessory locks, and
control the network access device to communicate an instruction for the accessory lock to alternate from the locked accessory state to the unlocked accessory state in response to the determination of the door unlock event and in response to the determination of the registered event.

11. A method for controlling locking of accessories by a vehicle, the method comprising:
receiving, by an input device, an unlock request corresponding to a request to alternate a door lock from a locked door state to an unlocked door state;
determining, by an electronic control unit (ECU), a door unlock event in response to the input device receiving the unlock request;

controlling, by the ECU, the door lock to alternate from the locked door state to the unlocked door state in response to determining the door unlock event; and controlling, by the ECU, a network access device to communicate an instruction for an accessory lock to alternate from a locked accessory state to an unlocked accessory state in response to determining the door unlock event.

12. The method of claim 11, wherein the accessory lock is an aftermarket lock that communicates with the network access device via a wireless protocol.

13. The method of claim 11, further comprising storing, by a memory, a list of registered accessory locks including the accessory lock.

14. The method of claim 13, further comprising controlling, by the ECU, the network access device to communicate an instruction for each of the registered accessory locks to alternate from the locked accessory state to the unlocked accessory state in response to determining the door unlock event.

15. The method of claim 13, further comprising:
receiving, by the network access device, a registration signal corresponding to registration of the accessory lock from a remote device; and
adding, by the ECU, identifying information corresponding to the accessory lock to the list of registered accessory locks in response to the network access device receiving the registration signal.

16. The method of claim 15, further comprising:
receiving, by the network access device, registration information corresponding to the registration of the accessory lock from the remote device; and
wherein adding the identifying information corresponding to the accessory lock to the list of registered accessory locks includes adding the identifying information corresponding to the accessory lock to the list of registered accessory locks based on the registration information.

17. The method of claim 16, further comprising:
receiving, by the network access device, a removal request corresponding to a request to remove the identifying information corresponding to the accessory lock from the list of registered accessory locks from the remote device; and
removing, by the ECU, the identifying information corresponding to the accessory lock from the list of registered accessory locks.

18. The method of claim 13, further comprising:
receiving, by the input device, registration information corresponding to registration of the accessory lock; and
adding, by the ECU, identifying information corresponding to the accessory lock to the list of registered accessory locks in response to the input device receiving the registration information.

19. The method of claim 13, wherein receiving the unlock request includes receiving the unlock request from a key fob configured to transmit the unlock request in response to receiving a first input pattern.

20. The method of claim 19, further comprising:
controlling, by the ECU, the network access device to communicate an instruction for a second accessory lock to alternate from the locked accessory state to the unlocked accessory state only in response to a second input pattern being received by the key fob,
wherein:
the list of registered accessory locks includes a first lock setting for the accessory lock indicating that the accessory lock is to alternate from the locked accessory state to the unlocked accessory state in response to the first input pattern being received by the key fob, and
the list of registered accessory locks includes a second lock setting for the second accessory lock indicating that the second accessory lock is to alternate from the locked accessory state to the unlocked accessory state in response to the second input pattern being received by the key fob.

* * * * *